United States Patent
Engel et al.

(10) Patent No.: US 10,551,582 B2
(45) Date of Patent: Feb. 4, 2020

(54) LAYOUT OF OPTICAL ENGINE COMPONENTS AND INTEGRATED CIRCUITS ON A TRANSCEIVER PRINTED CIRCUIT BOARD

(71) Applicant: FOXCONN INTERCONNECT TECHNOLOGY LIMITED, Grand Cayman (KY)

(72) Inventors: Andrew Engel, Portola Valley, CA (US); Paul Yu, Sunnyvale, CA (US); Klaus Giessler, Meulo Park, CA (US); Omid Momtahan, Palo Alto, CA (US); David Meadowcroft, San Jose, CA (US); Michael John Brosnan, Fremont, CA (US)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 221 days.

(21) Appl. No.: 15/448,614

(22) Filed: Mar. 3, 2017

(65) Prior Publication Data

US 2018/0252877 A1    Sep. 6, 2018

(51) Int. Cl.
*G02B 6/42*    (2006.01)

(52) U.S. Cl.
CPC .......... *G02B 6/428* (2013.01); *G02B 6/4246* (2013.01); *G02B 6/4257* (2013.01)

(58) Field of Classification Search
CPC .... G02B 6/428; G02B 6/4246; G02B 6/4257; G02B 6/4279; H04B 10/40; H04B 10/07; H05K 1/181; H05K 1/115; H05K 1/0243; H01L 23/13; H01L 31/16; H01L 31/02016; G01J 1/44
See application file for complete search history.

(56) References Cited

U.S. PATENT DOCUMENTS

| | | | |
|---|---|---|---|
| 6,381,283 B1 | 4/2002 | Bhardwaj et al. | |
| 6,527,458 B2 * | 3/2003 | Kim .................... | G02B 6/4246 385/89 |
| RE40,150 E * | 3/2008 | Ishibashi ............. | G02B 6/4246 361/785 |
| 8,831,437 B2 | 9/2014 | Dobbelaere et al. | |
| 9,229,167 B2 | 1/2016 | Chang et al. | |
| 2003/0142929 A1 * | 7/2003 | Bartur ................. | G02B 6/4214 385/92 |
| 2004/0091268 A1 * | 5/2004 | Hogan .................. | H04B 10/40 398/117 |

(Continued)

FOREIGN PATENT DOCUMENTS

JP        04271025 A  *  9/1992

*Primary Examiner* — Que Tan Le
*Assistant Examiner* — Jennifer D Bennett
(74) *Attorney, Agent, or Firm* — Wei Te Chung; Ming Chieh Chang

(57) ABSTRACT

A transceiver printed circuit board (PCB) includes an integrated circuit (IC) with at least two different functionality, a photodiode and a laser. The IC has a first side, a second side opposite to the first side, a third side connecting the first side and the second side, and a fourth side opposite to the third side. The photodiode and the laser are both located in a first space beside the first side. The functionality of a transimpedance amplifier, a laser driver, and a clock and data recovery is integrated into the IC.

3 Claims, 3 Drawing Sheets

(56) References Cited

U.S. PATENT DOCUMENTS

| | | | | |
|---|---|---|---|---|
| 2004/0240773 | A1* | 12/2004 | Kobinata | H01L 31/12 385/14 |
| 2004/0264887 | A1* | 12/2004 | Rosenberg | G02B 6/42 385/92 |
| 2005/0121684 | A1* | 6/2005 | Aruga | G02B 6/4204 257/99 |
| 2009/0103927 | A1* | 4/2009 | Cunningham | H04B 10/6971 398/139 |
| 2010/0008675 | A1* | 1/2010 | De Dobbelaere | G02B 6/4214 398/135 |
| 2013/0084044 | A1* | 4/2013 | Ertel | G02B 6/428 385/88 |
| 2015/0222236 | A1* | 8/2015 | Takemoto | H03F 3/08 250/214 A |
| 2016/0080090 | A1 | 3/2016 | Nagarajan | |

* cited by examiner

LAYOUT OF OPTICAL ENGINE COMPONENTS AND INTEGRATED CIRCUITS ON A TRANSCEIVER PRINTED CIRCUIT BOARD

BACKGROUND OF THE INVENTION

1. Field of the Invention

The present invention relates generally to a transceiver, and more particularly to a transceiver having an improving printed circuit board.

2. Description of Related Arts

U.S. Pat. No. 9,229,167, issued on Jan. 5, 2016, discloses a multiplexing/de-multiplexing system including a printed circuit board having a plurality of optical detectors, a plurality of transimpedance amplifier (TIA) array oriented along a direction that is parallel with the plurality of optical detectors, and a plurality of metal lines or traces. This arrangement allows the output from the TIA array to be transmitted via relatively short electrical metal lines or traces.

U.S. Patent Application Publication No. 2016/0080090, published on Mar. 17, 2016, discloses a multi-chip module for silicon photonics including an integrated system-on-chip device. The device may be configured on a single silicon substrate member or configured on three separate silicon substrate members. The device has, among others, an input/output block including a clock and data recovery (CDR) block, a driver module, and a receiver module including a TIA block.

FIG. 1 illustrate a prior art printed circuit board 100 adapted for a transceiver, the printed circuit board 100 includes a laser driver (LD) IC 10, a TIA IC 20 and a CDR IC 30, a PIN photodiode 40, a VCSEL laser 50, and a monitor pin 60. Most optical transceivers have a multi-source agreement (MSA) that dictates the optical pitch required for the transmit (Tx) and receive (Rx) paths, which in large part dictates where the PIN photodiode and VCSEL laser must be placed. For the SFP+ transceiver as an example, this pitch is 6.25 mm. Therefore, a distance between the PIN photodiode 40 and the VCSEL laser 50 is 6.25 mm. The TIA IC 20 and the LD IC 10 need to be placed close to the PIN photodiode 40 and the VCSEL laser 50 respectively to reduce the wire-bond length to improve signal integrity. Many wire-bonds and traces are needed to allow for proper communication between the different IC's. The length of the LD IC 10 is 3.5 mm, and the width of the LD IC is 1.8 mm. The length of the TIA IC 20 is 2.7 mm, and the width of the TIA IC is 1.8 mm. The length of the CDR IC 30 is 3.2 mm, and the width of the CDR IC is 3.2 mm. With this layout, the total IC footprint is 1.8*2.7+ 1.8*3.5+3.2*3.2=21.4 mm². Traditionally, typically one of the most expensive components in a fiber optics transceiver is the total silicon content used for the LD IC, TIA IC, and CDR IC. As the cost of each of these IC's scales with footprint surface area, it is desirable from a cost standpoint to reduce the size of these chips as much as possible. One way of doing this is to integrate the functionality of all three (LD, TIA, and CDR) into the same physical IC. However doing so does have its challenges. A fully combined single-IC solution would then need to find a way to span this gap, which puts a limit on how small the IC can be. Therefore, it is difficulty to orient the optics and the IC to reduce the size of the IC as much as possible, while maintaining similar signal integrity, and still meeting MSA.

SUMMARY OF THE INVENTION

An object of the present invention is to provide a transceiver having an improving printed circuit board which reduces the size of the IC and increases the available printed circuit board surface area.

To achieve the above-mentioned object, a transceiver printed circuit board (PCB) includes an integrated circuit (IC) with at least two different functionality, the IC having a first side, a second side opposite to the first side, a third side connecting the first side and the second side, and a fourth side opposite to the third side; a photodiode; and a laser; wherein the photodiode and the laser are both located in a first space beside the first side, and the functionality of a transimpedance amplifier, a laser driver, and a clock and data recovery is integrated into the IC.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to a preferred embodiment of the present invention.

Figure 1:
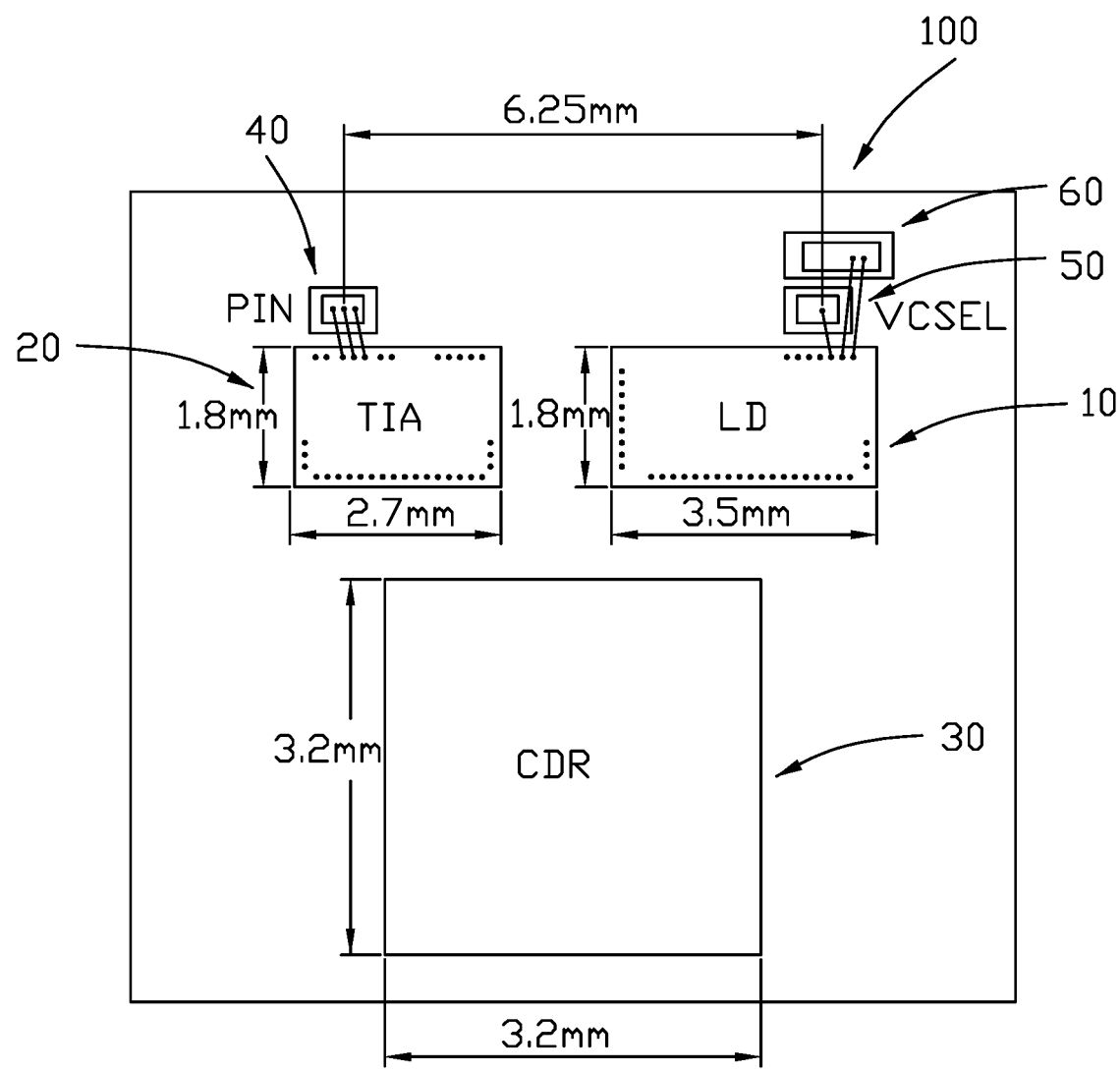
FIG. 1 is a perspective view of previously known transceiver printed circuit board.
Figure 2:
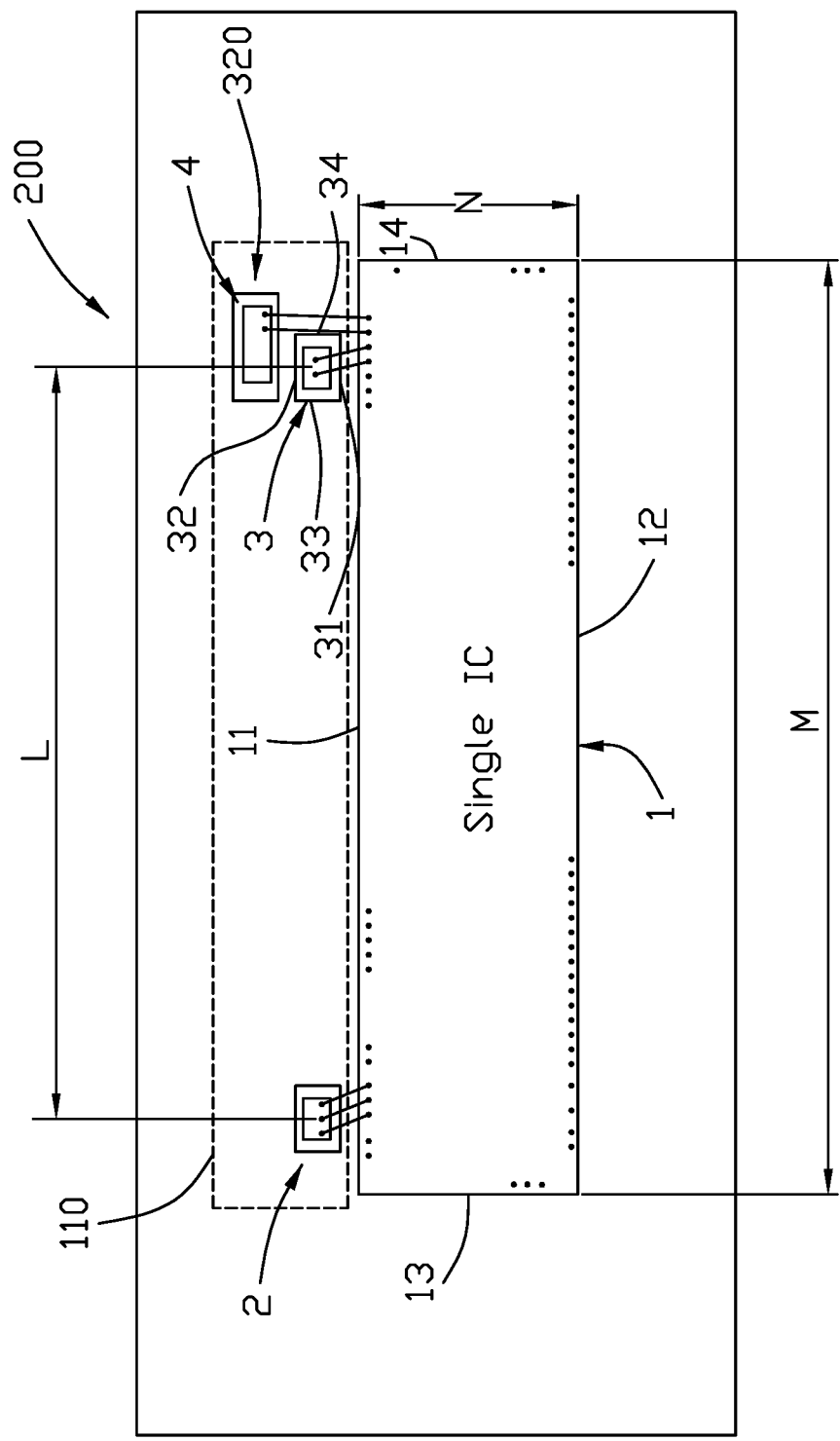
FIG. 2 is a perspective view of a transceiver printed circuit board in accordance with a first embodiment of the present invention.

Referring to FIG. 2, a transceiver printed circuit board 200 in accordance with a first embodiment of the present invention comprises a single IC 1, a PIN photodiode 2, a VCSEL laser 3, and a monitor pin 4. The single IC 1 has at least two different functionality from separate IC's. In the embodiment, the functionality of a transimpedance amplifier (TIA), a laser driver (LD), and a clock and data recovery (CDR) is integrated into the single IC 1. As there is no longer any intra-IC communication. In addition, the overall footprint can be reduced significantly. The single IC 1 has a first side 11, a second side 12 opposite to the first side 11, a third side 13 connecting the first side 11 and the second side 12, and a fourth side 14 opposite to the third side 13. The first side 11 is parallel to the second side 12, and the third side 13 is parallel to the fourth side 14. The length of the first side 11 and the second side 13 is larger than the length of the third side 13 and the fourth side 14, respectively.

The PIN photodiode 2 and the VCSEL laser 3 are both located in a first space 110 beside the first side 11. The PIN photodiode 2 and the PIN laser 3 are placed at two ends of the first space 110 respectively to form a distance L. The PIN photodiode 2 and the VCSEL laser 3 are placed in a line parallel to the first side 11 approximately. Most optical transceivers have a multi-source agreement (MSA) that dictates the optical pitch required for the transmit (Tx) and receive (Rx) paths, which in large part dictates where the PIN photodiode 2 and the VCSEL laser 3 must be placed.

For the SFP+ transceiver as an example, this pitch is 6.25 mm. Therefore, the distance L between the PIN photodiode 2 and the VCSEL laser 3 is 6.25 mm. The VCSEL laser 3 has a first head 31 beside the first side 11, a second head 32 opposite to the first head 31, and a third head 33 and a fourth head 34 connecting the first head 31 and the second head 32. The second head 32 is far away from the first side 11. The length of the first head 31 and the second head 32 is larger than the length of the third head 33 and the fourth head 34, respectively. The monitor pin 4 is placed in a second space 320 beside the second head 32 of the VCSEL laser 3.

The optical pitch puts a limit on how much this can be reduced as the length M of the single IC 1 still needs to be relatively large at 7.3 mm. For now a conservative best-guess at the width N is 2.6 mm, any reduction in this width will correspondingly reduce the overall footprint, and saving more cost and space. With this layout, the footprint of the single IC is 2.6*7.3=19.0 mm², and the total IC footprint has an 11% reduction from the current layout.

Figure 3:
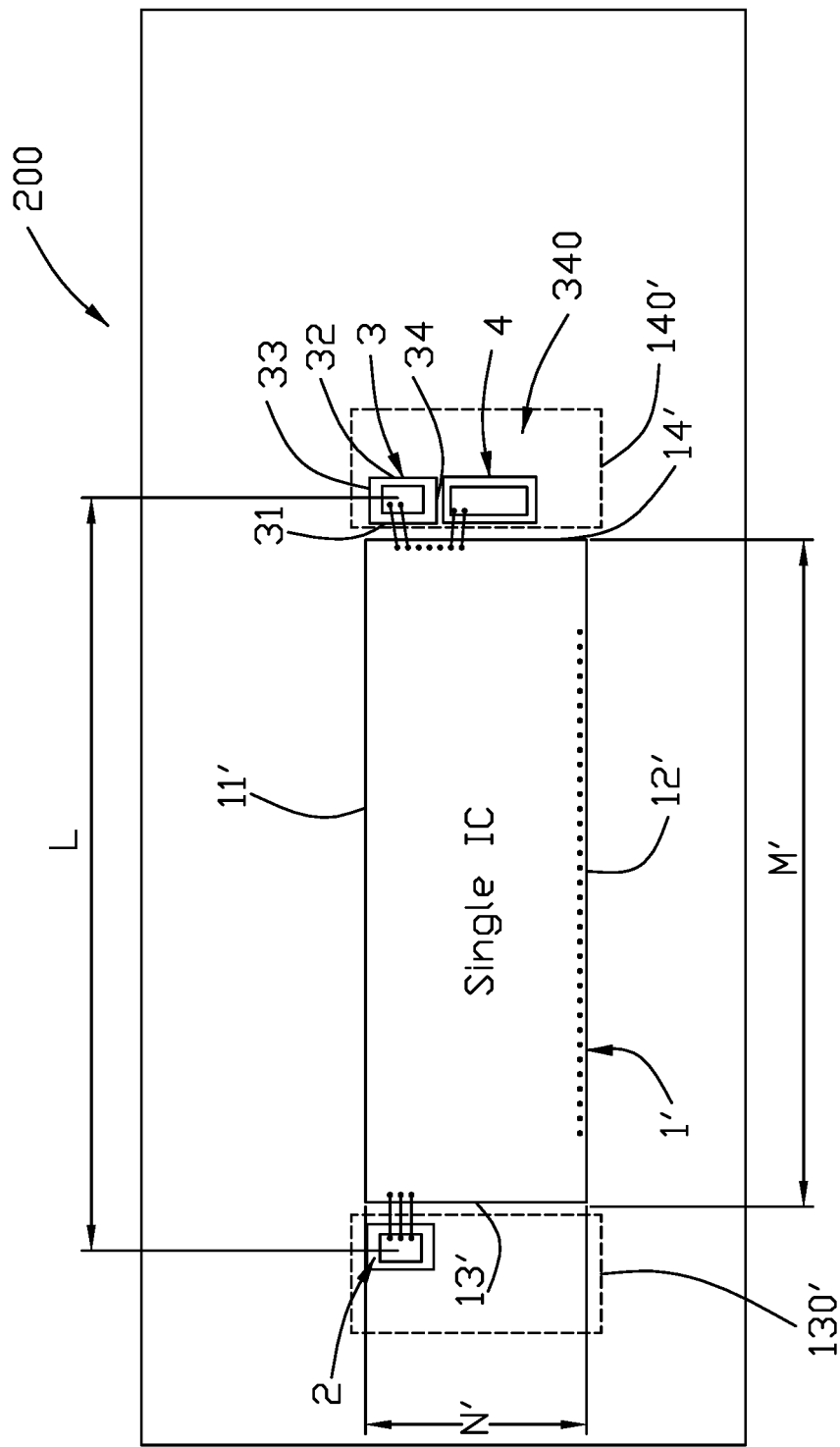
FIG. 3 is a perspective view of a transceiver printed circuit board in accordance with a second embodiment of the present invention.

Referring to FIG. 3, a transceiver printed circuit board 300 in accordance with a second embodiment of the present invention comprises a single IC 1', the PIN photodiode 2, the VCSEL laser 3 and the monitor pin 4. Turning both the PIN photodiode 2 and the VCSEL laser 3 90° and placing the single IC 1' in the middle of the PIN photodiode 2 and the VCSEL laser 3. The functionality of a transimpedance amplifier (TIA), a laser driver (LD) and a clock and data recovery (CDR) is integrated into the single IC 1'. As there is no longer any intra-IC communication. In addition, the overall footprint can be reduced significantly.

The single IC 1' has a first side 11', a second side 12' opposite to the first side 11', a third side 13' connecting the first side 11 and the second side 12, and a fourth side 14' opposite to the third side 13'. The first side 11' is parallel to the second side 12', and the third side 13' is parallel to the fourth side 14'. The length of the first side 11' and the second side 13' is larger than the length of third side 13' and the fourth side 14', respectively. The PIN photodiode 2 and the VCSEL laser 3 are located in two sides of the single IC 1' to form the distance L. The PIN photodiode 2 is placed at a first position 130' beside the third side 13', and the VCSEL laser 3 is placed at a second position 140' beside the fourth side 14'. The distance L between the PIN photodiode 2 and the VCSEL laser 3 is also 6.25 mm. The first head 31 of the VCSEL laser 3 is beside the fourth side 14', and the second head 32 of the VCSEL laser 3 is far away from the fourth side 14'. The monitor pin 4 is placed at a third position 340 beside the fourth head 34 and also placed at the second position 140' beside the fourth side 14'. The monitor pin 4 and the VCSEL laser 3 are located in a line beside the fourth side 14'.

In the second embodiment of the present invention, the wirebond lengths are kept the same, but their length helps to span part of the optical pitch, which makes the length of the single IC 1' smaller. This solution also clears out more space below the single IC 1', as the single IC 1' is pushed up relative to the optics, which can help to reduce the size of the optics and also gives more room for component placement on the transceiver printed circuit board 300. With this layout, the length M' of the single IC 1' is 5.4 mm, and the width N' of the single IC 1' is 2.6 mm. The footprint of the single IC 1' is 2.6*5.4=14.0 mm², and the single IC 1' has a 35% reduction from the current layout. In summary, the solution with improved layout in the second embodiment has the following benefits: firstly, more than 35% reduction in overall footprint, which corresponds to a similar reduction in overall IC cost; secondly, less wire-bonding, reducing costs and improving both UPH and yield; thirdly, reduction in overall optical engine size, helping to reduce component placement and overall layout complexity.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A transceiver PCB (Printed Circuit Board) comprising: a single combined IC (Integrated Circuit) defining a rectangular configuration with a pair of opposite long sides and a pair of opposite short sides for performing functions of a laser driver, a transimpedance amplifier, and a clock and data recovery; and a PIN photodiode, a VCSEL laser and a monitor pin discrete from one another; wherein said PCB defines a pair of small rectangular regions respectively located intimately by the pair of opposite short sides for mounting the PIN photodiode on one of said pair of rectangular regions and mounting the VCSEL laser and the monitor pin on the other of said pair of rectangular regions, wherein the PIN photodiode and the VCSEL laser commonly define an optical pitch there-between, said optical pitch being 6.25 mm; wherein each of said pair of small rectangular regions is defined by a long edge and a short edge, and said long edge is located adjacent to the corresponding short side and dimensioned similar to the corresponding short side.

2. A transceiver PCB (Printed Circuit Board) comprising: a single combined IC (Integrated Circuit) defining a rectangular configuration with a pair of opposite long sides and a pair of opposite short sides for performing functions of a laser driver, a transimpedance amplifier, and a clock and data recovery; and a PIN photodiode, a VCSEL laser and a monitor pin discrete from one another; wherein said PCB defines a pair of small rectangular regions respectively located intimately by the pair of opposite short sides for mounting the PIN photodiode on one of said pair of rectangular regions and mounting the VCSEL laser and the monitor pin on the other of said pair of rectangular regions, wherein the PIN photodiode and the VCSEL laser commonly define an optical pitch there-between, said optical pitch being 6.25 mm; wherein each of said PIN photodiode, said VSCEL laser and said monitor pin defines long edge and a short edge, and the corresponding long edge is parallel to and adjacent to the short side when mounted in the respective small rectangular region.

3. A transceiver PCB (Printed Circuit Board) comprising: a single combined IC (Integrated Circuit) defining a rectangular configuration with a pair of opposite long sides and a pair of opposite short sides for performing functions of a laser driver, a transimpedance amplifier, and a clock and data recovery; and a PIN photodiode, a VCSEL laser and a monitor pin discrete from one another; wherein said PCB defines a pair of small rectangular regions respectively located intimately by the pair of opposite short sides for mounting the PIN photodiode on one of said pair of rectangular regions and mounting the VCSEL laser and the monitor pin on the other of said pair of rectangular regions, wherein the PIN photodiode and the VCSEL laser commonly define an optical pitch there-between, said optical pitch being 6.25 mm; wherein a layout area occupied by the single combined IC is 2.6 mm*5.4 mm when said pair of small rectangular regions are used.

* * * * *